C. MAGNÉE & E. DEMEURE.
DEVICE FOR INCREASING THE EFFICIENCY OF FUELS.
APPLICATION FILED MAR. 22, 1907.

985,188.

Patented Feb. 28, 1911.

2 SHEETS—SHEET 1.

WITNESSES

INVENTORS
CAMILLE MAGNÉE
EDOUARD DEMEURE

C. MAGNÉE & E. DEMEURE.
DEVICE FOR INCREASING THE EFFICIENCY OF FUELS.
APPLICATION FILED MAR. 22, 1907.

985,188.

Patented Feb. 28, 1911.

2 SHEETS—SHEET 2.

WITNESSES.

INVENTORS
CAMILLE MAGNÉE
EDOUARD DEMEURE

UNITED STATES PATENT OFFICE.

CAMILLE MAGNÉE, OF MARCINELLE-CHARLEROI, AND EDOUARD DEMEURE, OF BRUSSELS, BELGIUM.

DEVICE FOR INCREASING THE EFFICIENCY OF FUELS.

985,188. Specification of Letters Patent. Patented Feb. 28, 1911.

Application filed March 22, 1907. Serial No. 363,945.

*To all whom it may concern:*

Be it known that we, CAMILLE MAGNÉE, a subject of the King of the Belgians, and resident of 18 Place de la Villette, Marcinelle-Charleroi, and EDOUARD DEMEURE, a subject of the King of the Belgians, and resident of 53 Avenue des Arts, Brussels, Belgium, have invented certain new and useful Improvements in Devices for Increasing the Efficiency of Fuels, of which the following is a specification.

In the patent application filed in the name of Camille Magnée, Serial Number 361,725, dated March 11, 1907, there has been described a process for increasing the efficiency of fuels, by feeding to fires, furnaces, hearths, or fire-boxes, etc., either mechanically or by chimney suction a mixture of air and steam, or any other mixture of suitable proportions previously brought to a high temperature and into contact with the incandescent fuel.

The object of the present invention is to provide a device for introducing this process into practice.

The device consists essentially in providing: 1st. One or more chambers in which takes place a thorough mixing of air and steam or vapor. 2nd. One or more series of conduits or pipes in which takes place an active vaporization of the mixture so obtained, which mixture enters under the fire-grate.

One form of the invention is represented in the annexed drawings in which:—

Figure 1:
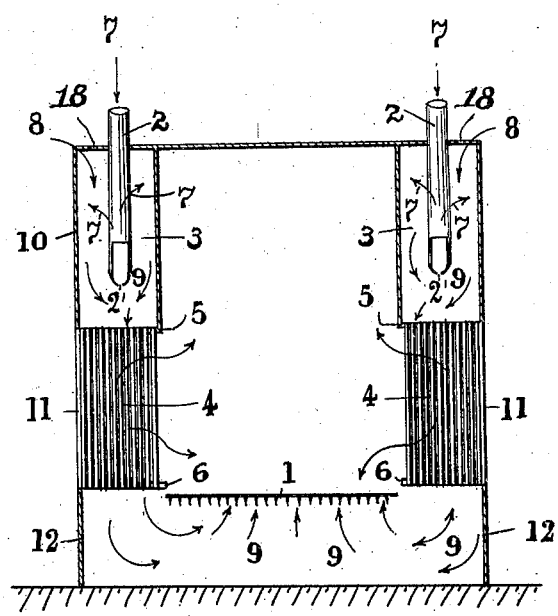
Figure 4:
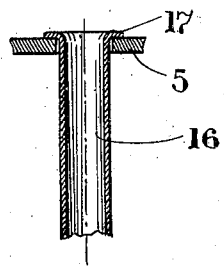
Figure 2:
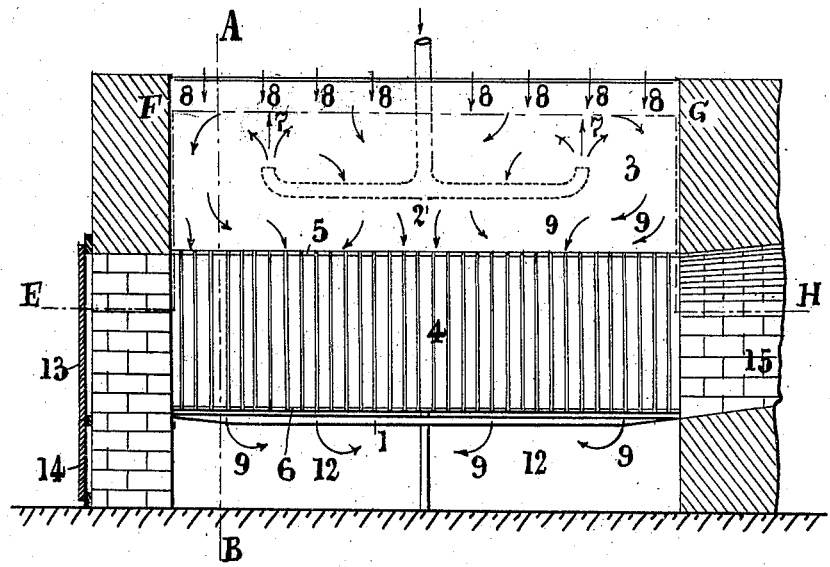
Figure 3:
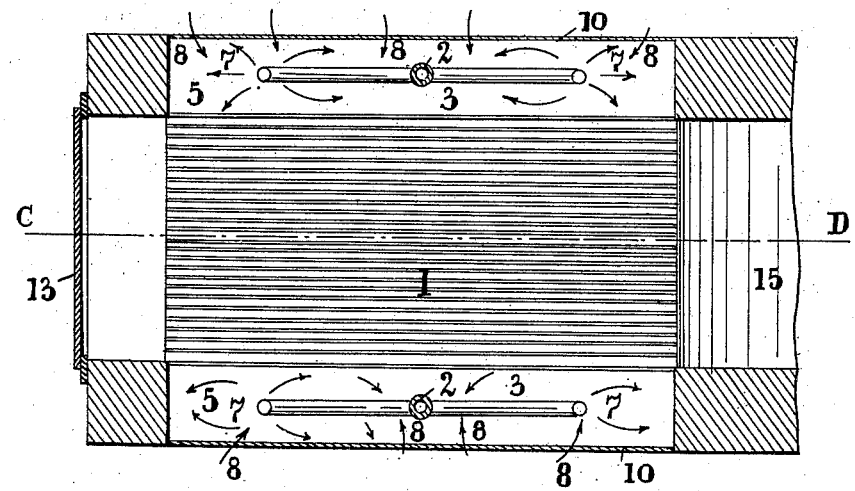

Figure 1 is a vertical cross-section of the apparatus on line A—B of Fig. 2. Fig. 2 is a vertical longitudinal section of the apparatus on line C—D of Fig. 3. Fig. 3 is a horizontal section of the device on lines E, F, G, H, of Fig. 2. Fig. 4 shows a mode of suspension for pipes.

Referring to the drawings:—1 is the fire grate.

2, 2 are steam pipes.

2′, 2′ are openings for the discharge of water of condensation.

3, 3 are chambers where the mixing of air and steam takes place.

4, 4 are series of tubes or conduits, which are heated by the radiation of the fire, and through which the mixture of air and steam, coming from the mixing chambers, flows.

5, 5 are plates in which the tubes 4 are suspended.

6, 6 are plates in which the lower ends of the tubes are inserted.

7, 7 . . . 7 are arrows showing the direction in which the steam moves.

8, 8 . . . 8 are arrows showing the air entrances.

9, 9 . . . 9 show the directions in which the mixture of steam and air flows.

10, 11 and 12 are panels which form part of the casing of the device.

13 is the door of the fire-box and 14 the door of the ash-pit.

15 is the bridge-wall.

The form which has been represented by way of example in the annexed drawings, shows a duplicate device applied to boilers. In this form, each half of the device is substituted for one of the side walls of the fire-box. Steam enters through the pipes 2 in the mixing chambers 3. Air is admitted to the chambers as indicated by the arrows 8, through a slot 18, as clearly shown in Fig. 1. It is advisable to direct the steam and the air in such a way as to obtain a very active mixing. The mixing of the steam and air is brought under the fire grate through multitubular conduits of suitable dimensions. In the form shown in the annexed drawings, these conduits are formed by means of series of metallic tubes. The conduits may also be made of other fire proof material. In the example shown the tubes are of small diameter and very close to each other.

It will be noted that both the mixing chambers 3 and the tubes 4 for conveying the mixture of air and steam beneath the grate, are all located within the walls of the combustion chamber and consequently are subjected to the intense heat therein.

By our improved construction the natural chimney draft or suction is sufficient to effect a proper delivery of the mixture of air and steam beneath the grate and a much more even feed obtained than by the old method of forcing the mixture in the form of a blast. The latter method also tends to hasten combustion with a consequent waste of fuel.

The door 13 of the fire box and the door 14 of the ash pit remain closed during the working of the device.

Fig. 4 shows a method of suspending the tubes in which the tube 16 is provided with a flange 17, by means of which it is suspended in the upper tube plate 5, while it is simply inserted in the lower tubular plate 6. This method of assembling allows of the expansion of the tubes. The joints do not require to be tight since there is no pressure either in the mixing chamber or around the series of tubes.

The mixing chamber is of such a height that the examination and the extraction of tubes from the series can be effected at any time without drawing the fire.

The use of this device will not hinder the simultaneous use of any other systems of heat conservation.

Having now fully described our invention, what we claim is:—

1. A device for increasing the efficiency of fuel comprising the combination with a fire-box having a fire-grate and bridge wall, of mixing chambers having inlets for admitting air and steam to said chambers, said fire-box forming a combustion-chamber, a series of vertical tubes or conduits connected to the bottom of the mixing chambers and discharging beneath the fire-grate, said mixing chambers and tubes being positioned within the combustion chamber and occupying the space originally occupied by the side walls of the combustion chamber, substantially as described.

2. A device for increasing the efficiency of fuel comprising the combination with a fire-box having a fire-grate and a bridge-wall, said fire-box forming a combustion-chamber, of mixing chambers for air and steam located within the fire-box and exposed to the direct heat of the fire, vertical tubes or conduits connected to the bottom of the mixing chambers and discharging beneath the fire-grate, said tubes being within the fire-box and also exposed to the direct heat of the fire, substantially as described.

In witness whereof we have hereunto set our hands in presence of the witnesses.

CAMILLE MAGNÉE.
EDOUARD DEMEURE.

Witnesses:
 E. LEYLE,
 PAUL MAGNEE.

---

Copies of this patent may be obtained for five cents each, by addressing the "Commissioner of Patents, Washington, D. C."